(12) United States Patent　　(10) Patent No.: US 7,416,817 B2
Kawase et al.　　(45) Date of Patent: Aug. 26, 2008

(54) BATTERY

(75) Inventors: Kenichi Kawase, Kanagawa (JP); Tomoo Takada, Kanagawa (JP); Yukio Miyaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 668 days.

(21) Appl. No.: 10/713,969

(22) Filed: Nov. 14, 2003

(65) Prior Publication Data

US 2004/0151987 A1　Aug. 5, 2004

(30) Foreign Application Priority Data

Nov. 19, 2002　(JP)　............................ P2002-335055

(51) Int. Cl.
*H01M 6/16*　(2006.01)
(52) U.S. Cl. .................... 429/338; 429/330; 429/218.1; 429/231.1; 429/231.3
(58) Field of Classification Search ................ 429/338, 429/330, 218.1, 231.1, 231.3
See application file for complete search history.

(56) References Cited

U.S. PATENT DOCUMENTS

| | | | |
|---|---|---|---|
| 6,511,776 B1 * | 1/2003 | Ohshita et al. | 429/338 |
| 6,551,743 B1 * | 4/2003 | Nakanishi et al. | 429/231.1 |
| 7,097,944 B2 * | 8/2006 | Murai et al. | 429/330 |
| 2004/0106047 A1 * | 6/2004 | Mie et al. | 429/330 |
| 2006/0172201 A1 * | 8/2006 | Yasukawa et al. | 429/330 |

* cited by examiner

*Primary Examiner*—Laura S Weiner
(74) *Attorney, Agent, or Firm*—Sonnenschien Nath & Rosenthal LLP

(57) ABSTRACT

The invention provides a battery which can improve cycle characteristics by forming a more stable and stronger film on the surface of an anode active material layer. A cathode and an anode are layered with a separator in between. The anode has an anode collector and the anode active material layer. The anode active material layer contains Si, Sn, or an alloy thereof, and formed by vapor-phase method, liquid phase method, or sinter method. It is preferable that the anode active material layer is alloyed with the anode collector on at least a part of interface between the anode active material layer and the anode collector. The separator is impregnated with an electrolyte solution. The electrolyte solution contains cyclic carbonic ester having saturated bonds such as vinylene carbonate and vinylethylene carbonate as a solvent. Consequently, a strong and stable film is formed on the surface of the anode active material layer, and decomposition of the electrolyte solution in the anode is inhibited.

7 Claims, 3 Drawing Sheets

BATTERY

RELATED APPLICATION DATA

The present application claims priority to Japanese Application(s) No(s). P2002-335055 filed Nov. 19, 2003, which application(s) is/are incorporated herein by reference to the extent permitted by law.

BACKGROUND OF THE INVENTION

1. Field of the Invention

The present invention relates to a battery comprising a cathode, an anode, and an electrolyte, and more particularly such a battery whose anode has an anode collector and an anode active material layer.

2. Description of the Related Art

In recent years, in connection with high-performance and multi-function of mobile devices, high capacities of secondary batteries, the power source for the mobile devices have been desired earnestly. As a secondary battery which meets this demand, there is a lithium secondary battery. However, in the case of using cobalt acid lithium for a cathode and graphite for an anode, which is currently a typical form for lithium secondary batteries, a battery capacity is in a saturated state, and it is extremely difficult to greatly obtain a high capacity of the battery. Therefore, from old times, using metal lithium (Li) for an anode has been considered. However, in order to put this anode to practical use, it is necessary to improve efficiency of precipitation dissolution of lithium and to control dendrite precipitation form.

Meanwhile, a high capacity anode using silicon (Si), tin (Sn) or the like has been actively considered. However, when charge and discharge are repeated, these anodes are pulverized and miniaturized due to significant expansion and shrinkage of an anode active material, collecting characteristics are lowered, and decomposition reaction of an electrolyte solution is facilitated due to an increased superficial area, so that their cycle characteristics are extremely poor. Therefore, an anode wherein an anode active material layer is formed on an anode collector by vapor-phase method, liquid phase method, sinter method and the like has been considered (for example, refer to Japanese Unexamined Patent Application Publication No. H08-50922, Japanese Patent No. 2948205, and Japanese Unexamined Patent Application Publication No. H11-135115). According to this anode, since miniaturization can be inhibited compared to conventional application type anodes wherein slurry containing a particulate anode active material and a binder is applied, and the anode collector and the anode active material layer can be integrated, so that electronic conductivity in the anode becomes extremely excellent, and high performance in terms of capacity and cycle life is expected. In addition, a conductive material, a binder, and voids which have existed in the anode conventionally can be reduced or excluded. Therefore, the anode can become a thin film essentially.

However, even in the anode wherein the anode active material layer is formed on the anode collector by vapor-phase method, liquid phase method, or sinter method, there is a problem that a film formed on the surface of the anode active material layer is not stabilized due to expansion and shrinkage of the anode active material associated with charge and discharge, so that continuous decomposition reaction of the electrolyte solution is induced. Therefore, even in this case, it is difficult to say that its cycle characteristic are sufficient. That is, it is necessary that more stable and stronger film is formed on the surface of the anode active material layer.

SUMMARY OF THE INVENTION

The invention has been achieved in consideration of such problems, and it is an object of the invention to provide a battery which can improve cycle characteristics by forming a more stable and stronger film on the surface of an anode active material layer.

A first battery according to the invention comprises a cathode, an anode, and an electrolyte. The anode comprises an anode collector, and an anode active material layer which is provided on the anode collector and which is alloyed with the anode collector on at least a part of interface between the anode active material layer and the anode collector. The electrolyte contains an electrolyte solution which includes cyclic carbonic acid ester having unsaturated bonds and an electrolytic salt.

A second battery according to the invention comprises a cathode, an anode and an electrolyte. The anode comprises an anode collector, an anode active material layer which is formed on the anode collector by at least one method from the group consisting of vapor-phase method, liquid phase method and sinter method. The electrolyte contains an electrolyte solution containing cyclic carbonic acid ester having unsaturated bonds and an electrolytic salt.

In the first and the second batteries according to the invention, by cyclic carbonic acid ester having unsaturated bonds, a strong and stable film is formed on the surface of the anode active material layer, and decomposition of the electrolyte solution is inhibited.

Other and further objects, features and advantages of the invention will appear more fully from the following description.

DETAILED DESCRIPTION OF THE PREFERRED EMBODIMENTS

Embodiments of the invention will be described in detail hereinbelow with reference to the drawings.

First Embodiment

Figure 1:
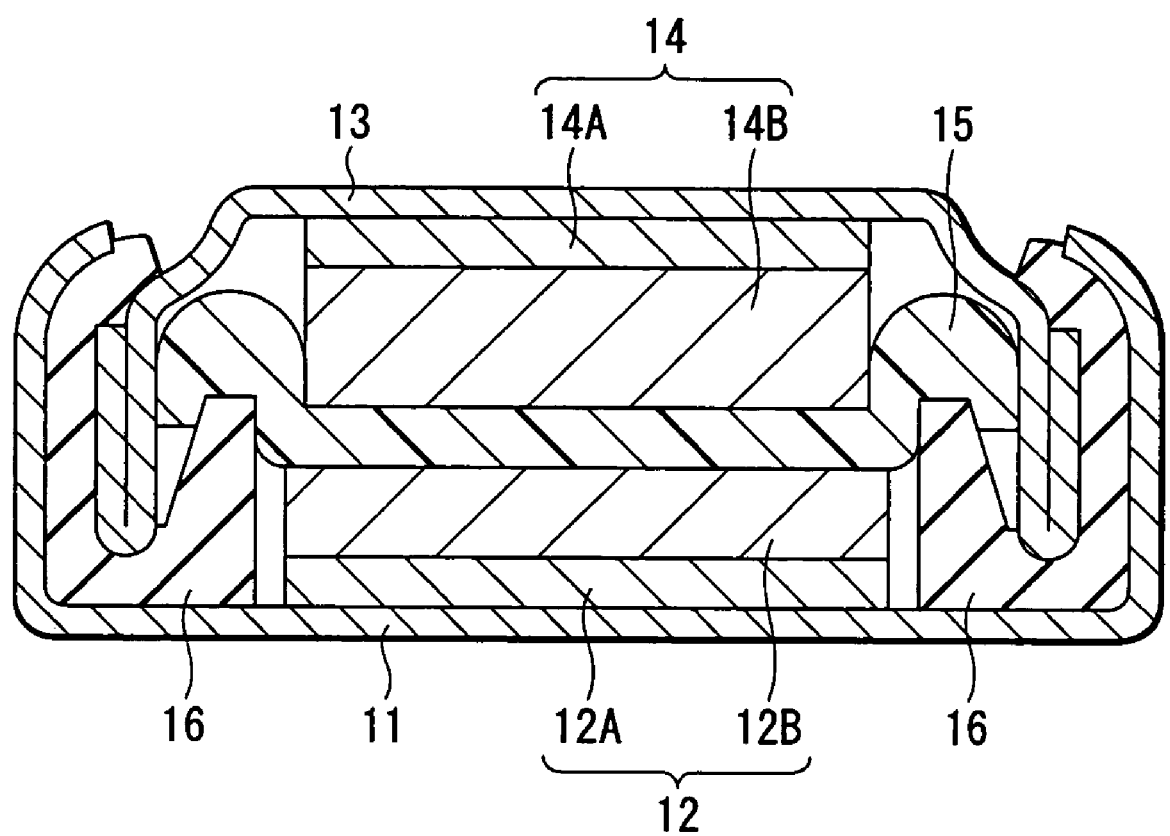
FIG. 1 is a cross sectional view showing a construction of a secondary battery according to a first embodiment of the invention.

FIG. 1 shows a construction of a secondary battery according to a first embodiment of the invention. This secondary battery is so-called coin type secondary battery, wherein a discoid cathode 12 housed in an exterior can 11 and a discoid anode 14 housed in an exterior cup 13 are layered with a separator 15 in between. Peripheries of the exterior can 11 and the exterior cup 13 are sealed by caulking with insulative gaskets 16. The exterior can 11 and the exterior cup 13 are, for example, made of a metal such as stainless or aluminum (Al), respectively.

The cathode 12 has, for example, a cathode collector 12A and a cathode active material layer 12B provided on the cathode collector 12A. The cathode collector 12A is, for example, made of aluminum, nickel (Ni), stainless and the like.

The cathode active material layer 12B contains, for example, one or more kinds of cathode materials which can insert and extract lithium as a cathode active material, and can contain a conductive material such as carbon materials, and a binder such as polyvinylidene fluoride as necessary. As a cathode material which can insert and extract lithium, for example, metal complex oxides including lithium expressed as a general formula of $Li_xMIO_2$ are preferable. Since the metal complex oxides including lithium can generate high voltage and their densities are high, further high capacity of the secondary battery can be obtained. MI means one or more transition metals, and, MI is preferably, for example, at least one of cobalt (Co) and nickel. x differs due to charge and discharge conditions of the battery, and normally is a value in the range of $0.05 \leq x \leq 1.10$. Concrete examples of such metal complex oxides including lithium are $LiCoO_2$, $LiNiO_2$ and the like.

The anode 14 has, for example, an anode collector 14A, an anode active material layer 14B provided on the anode collector 14A. It is preferable that the anode collector 14A is made of, for example, copper (Cu), stainless, nickel, titanium (Ti), tungsten (W), molybdenum (Mo), aluminum or the like, and specially, in some cases, it is more preferable that the anode collector 14A is made of a metal which is easily alloyed with the anode active material layer 14B. For example, as described later, in the case where the anode active material layer 14B includes at least one kind from the group consisting of a simple substance and compounds of silicon or tin, copper, titanium, aluminum, nickel and the like can be cited as a material which is easily alloyed. Though the anode collector 14A can be composed of a single layer, it is also possible that the anode collector 14A is composed of several layers. In this case, it is possible that a layer adjacent to the anode active material layer 14B is made of a metal material which is easily alloyed with the anode active material layer 14B, and other layers are made of other metal materials.

The anode active material layer 14B is, for example, formed by at least one method from the group consisting of vapor-phase method, liquid phase method, and sinter method, and includes an anode active material. In result, it is possible to inhibit breakage due to expansion or shrinkage of the anode active material layer 14B involved in charge and discharge, to integrate the anode collector 14A and the anode active material layer 14B, and to improve electronic conductivity in the anode 14. In addition, differing from conventional application type anodes, a binder, voids and the like can be reduced or excluded, so that the anode can become a thin film. This anode active material layer 14B is preferably alloyed with the anode collector 14A on at least a part of interface between the anode active material layer 14B and the anode collector 14A. Specifically, it is preferable that on the interface, a component element of the anode collector 14A diffuses into the anode active material layer 14B, or a component element of the anode active material diffuses into the anode collector 14A, or both of them diffuse into each other. This alloying often coincides with forming the anode active material layer 14B by vapor-phase method, liquid phase method, or sinter method. However, the alloying can be generated by applying further heat treatment. In this specification, diffusion of the foregoing elements is included in the alloying as one form.

As an anode active material, it is preferable that at least one kind from the group consisting of a simple substance and compounds of silicon or tin is included. A simple substance and compounds of silicon or tin can form an alloy with lithium and the like, and have large capacity to insert and extract lithium. Depending on their combinations, it is possible that energy density of the anode 14 is raised compared to conventional carbon. Compounds of silicon or tin include $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiOv$ ($0<v\leq 2$), $SnO_w$ ($0<W\leq 2$), $SnSio_3$, $LiSiO$, and $LiSnO$.

The separator 15 is intended to separate the cathode 12 and the anode 14, to protect current short circuit due to contact between the cathode 12 and the anode 14, and to put lithium ions through. This separator 15 is made of, for example, polyethylene or polypropylene.

The separator 15 is impregnated with an electrolyte solution, which is a solid electrolyte. This electrolyte solution contains, for example, a solvent and lithium salt which is an electrolytic salt dissolved in this solvent, and can contain an additive as necessary. It is preferable that cyclic carbonic acid ester having unsaturated bonds between carbon atoms, i.e. having double bonds or triple bonds between carbon atoms is used for a solvent. The cyclic carbonic acid ester having unsaturated bonds forms a strong and stable film on the surface of the anode active material layer 14B, and has hereby a function to inhibit decomposition of the electrolyte solution in the anode 14.

As cyclic carbonic acid ester having unsaturated bonds, for example, vinylene carbonate, vinylethylene carbonate, 3-methylvinylene carbonate, 3-ethlyvinylene carbonate, 3-propylvinylene carbonate, and 3-phenylvinylene carbonate can be cited. Specially, in order to form a strong and stable film, it is preferable that at least one of vinylene carbonate and vinylethylene carbonate is used.

For a solvent, it is preferable to further use one or mixture of two or more of other organic solvents such as ethylene carbonate, propylene carbonate, dimethyl carbonate, diethyl carbonate, ethyl methyl carbonate and the like.

A content (concentration) of the cyclic carbonic acid ester having unsaturated bonds in the electrolyte solution is preferably from 0.1 wt % to 30 wt %, and is more preferably from 1.0 wt % to 15 wt %. When the content of the cyclic carbonic acid ester is low, a stable film cannot be formed sufficiently. When the content of the cyclic carbonic acid ester is high, decomposition quantity of the cyclic carbonic acid ester becomes large, impedance of the anode 14 is raised, and load characteristics of the battery is largely lowered.

As a lithium salt, for example, $LiPF_6$, $LiCF_3SO_3$ or $LiClO_4$ can be cited. One of them, or mixture of two or more of them can be used.

This secondary battery can be, for example, manufactured as follows.

First, for example, a cathode active material, a conductive material, and a binder are mixed to prepare a cathode mixture, which is dispersed in a dispersion medium such as N-methylpyrrolidone to thereby obtain a cathode mixture slurry. Subsequently, after this cathode mixture slurry is applied to the cathode collector 12A and dried, the resultant is compression-molded. Consequently, the cathode active material layer 12B is formed, and the cathode 12 is fabricated.

Subsequently, by using vapor-phase method and liquid phase method, the anode active material layer 14B is formed by depositing an anode active material, for example, at least one kind from the group consisting of a single substance and compounds of silicon or tin, onto the anode collector 14A. It is possible that, after forming a precursor layer containing a particulate anode active material on the anode collector 14A, the anode active material layer 14B is formed by sinter method to sinter the precursor layer. It is also possible that the anode active material layer 14B is formed by combining two or three methods from vapor-phase method, liquid phase method and sinter method. In this way, by forming the anode active material layer 14B by using at least one method from the group consisting of vapor-phase method, liquid phase method and sinter method, in some cases, the anode active material layer 14B which is alloyed with the anode collector 14A on at least a part of interface between the anode active material layer 14B and the anode collector 14A is formed. In order to further alloy the interface between the anode collector 14A and the anode active material layer 14B, it is possible to further apply heat treatment under vacuum atmosphere or non-oxidizing atmosphere. In particular, when the anode active material layer 14B is formed by plating described later, the anode active material layer 14B may be hard to be alloyed even on the interface between the anode collector 14A and the anode active material layer 14B. Therefore, it is preferable to apply this heat treatment as necessary. Further, when the anode active material layer 14B is formed by vapor-phase method, it is also preferable to apply this heat treatment as necessary, since characteristics may be improved by further alloying the interface between the anode collector 14A and the anode active material layer 14B.

As vapor-phase method, physical deposition method or chemical deposition method can be used according to types of anode active materials. Specifically, vacuum deposition method, sputter method, ion plating method, laser ablation method, heat CVD (chemical vapor deposition) method, plasma CVD method and the like can be utilized. As liquid phase method, known techniques such as electrolytic plating, non-electrolytic plating and the like can be utilized. For sinter method, known techniques can be utilized as well, for example, atmosphere sinter method, reaction sinter method, or hot press sinter method can be utilized.

After fabricating the cathode 12 and the anode 14, for example, the anode 14, the separator 15 impregnated with an electrolyte solution, and the cathode 12 are layered. That lamination is put into the exterior cup 13 and the exterior can 11, and caulked. Consequently, the secondary battery shown in FIG. 1 can be obtained.

This secondary battery acts as follows.

In this secondary battery, when charged, lithium ions extract from the cathode 12, and those lithium ions are inserted into the anode 14 through the electrolyte solution. Then, a strong and stable film is formed on the anode active material layer 14B by cyclic carbonic acid ester having unsaturated bonds, and decomposition of the electrolyte solution in the anode 14 is inhibited. When discharged, for example, lithium ions extract from the anode 14, and those lithium ions are inserted into the cathode 12 through the electrolyte solution.

As above, in this embodiment, since cyclic carbonic acid ester having unsaturated bonds is included, a strong and stable film can be formed on the anode active material layer 14B, and decomposition of the electrolyte solution in the anode 14 is inhibited by this film. In result, cycle characteristics can be improved.

Specially, when a content of the cyclic carbonic acid ester in the electrolyte solution is set to 0.1 wt % to 30 wt %, it is possible to inhibit lowering of load characteristics and to improve charge and discharge cycle characteristics.

Second Embodiment

Figure 2:
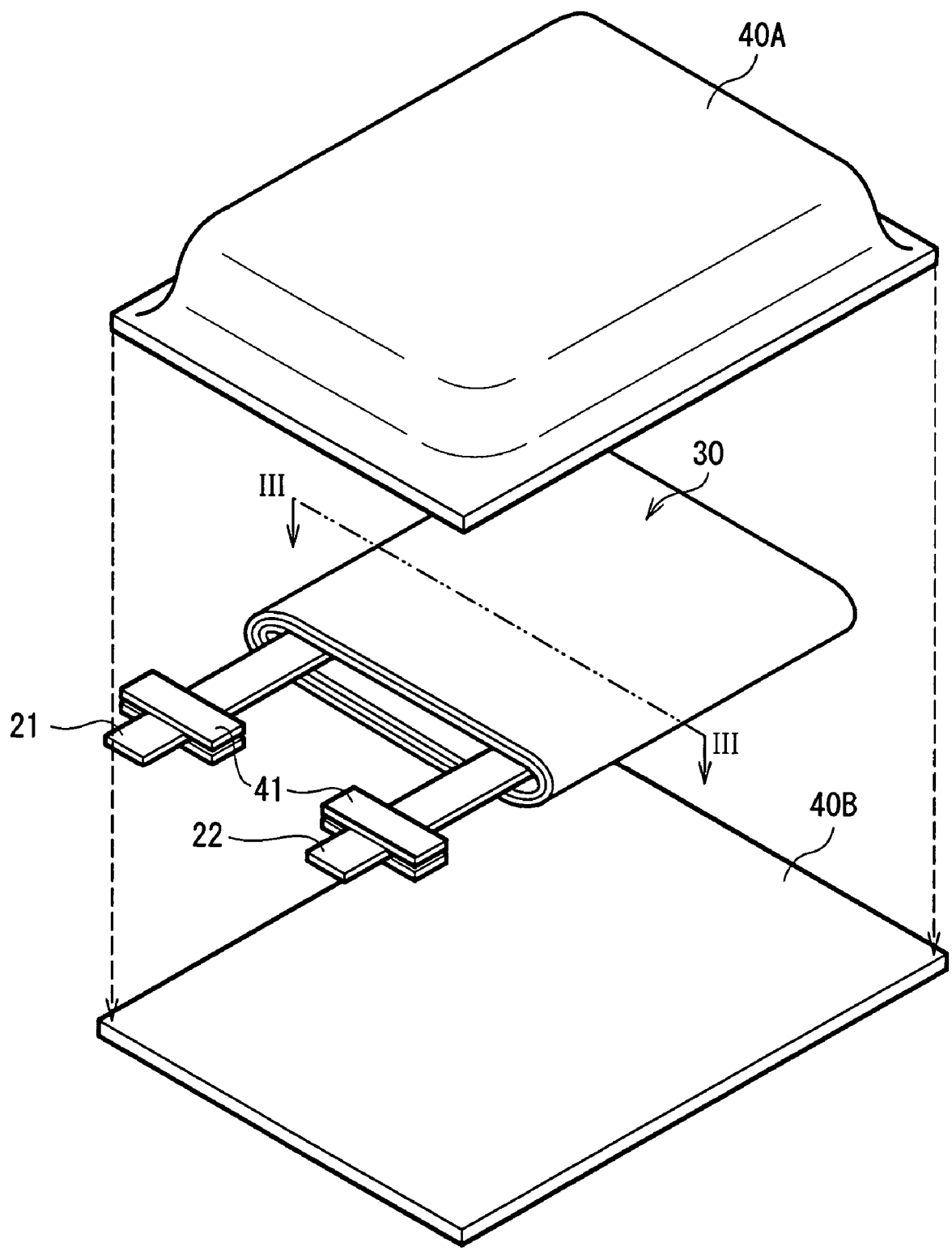
FIG. 2 is an exploded perspective view showing a construction of a secondary battery according to a second embodiment of the invention.

FIG. 2 shows an exploded view showing a construction of a secondary battery according to a second embodiment of the invention. This secondary battery is a secondary battery wherein an electrode winding body 30 to which a cathode lead 21 and an anode lead 22 are attached is housed inside of film exterior members 40A and 40B, and its size, weight and thickness can be reduced.

The cathode lead 21 and the anode lead 22 are directed from inside of the exterior members 40A and 40B to outside, and, for example, are derived in the same direction. The cathode lead 21 and the anode lead 22 are respectively made of a metal material such as aluminum, copper, nickel, and stainless, and are respectively in the shape of a thin plate or in the shape of a net.

The exterior members 40A and 40B are made of aluminum laminated films in the shape of rectangle, wherein, for example, a nylon film, an aluminum foil, and a polyethylene film are bonded together in this order. The exterior members 40A and 40B are, for example, arranged so that a polyethylene film side and the electrode winding body 30 are placed opposite, and respective outer edge parts are appressed to each other by anastomoses or an adhesive. Adhesive films 41 to protect from outside air intrusion are inserted between the exterior members 40A, 40B, and the cathode lead 21, the anode lead 22. The adhesive films 41 are made of a material having contact characteristics to the cathode lead 21 and the anode lead 22, for example a polyolefin resin such as polyethylene, polypropylene, modified polyethylene, and modified polypropylene.

The exterior members 40A and 40B can be made of laminated films having other structures, polymer films such as polypropylene, or metal films, instead of the foregoing aluminum laminated film.

Figure 3:
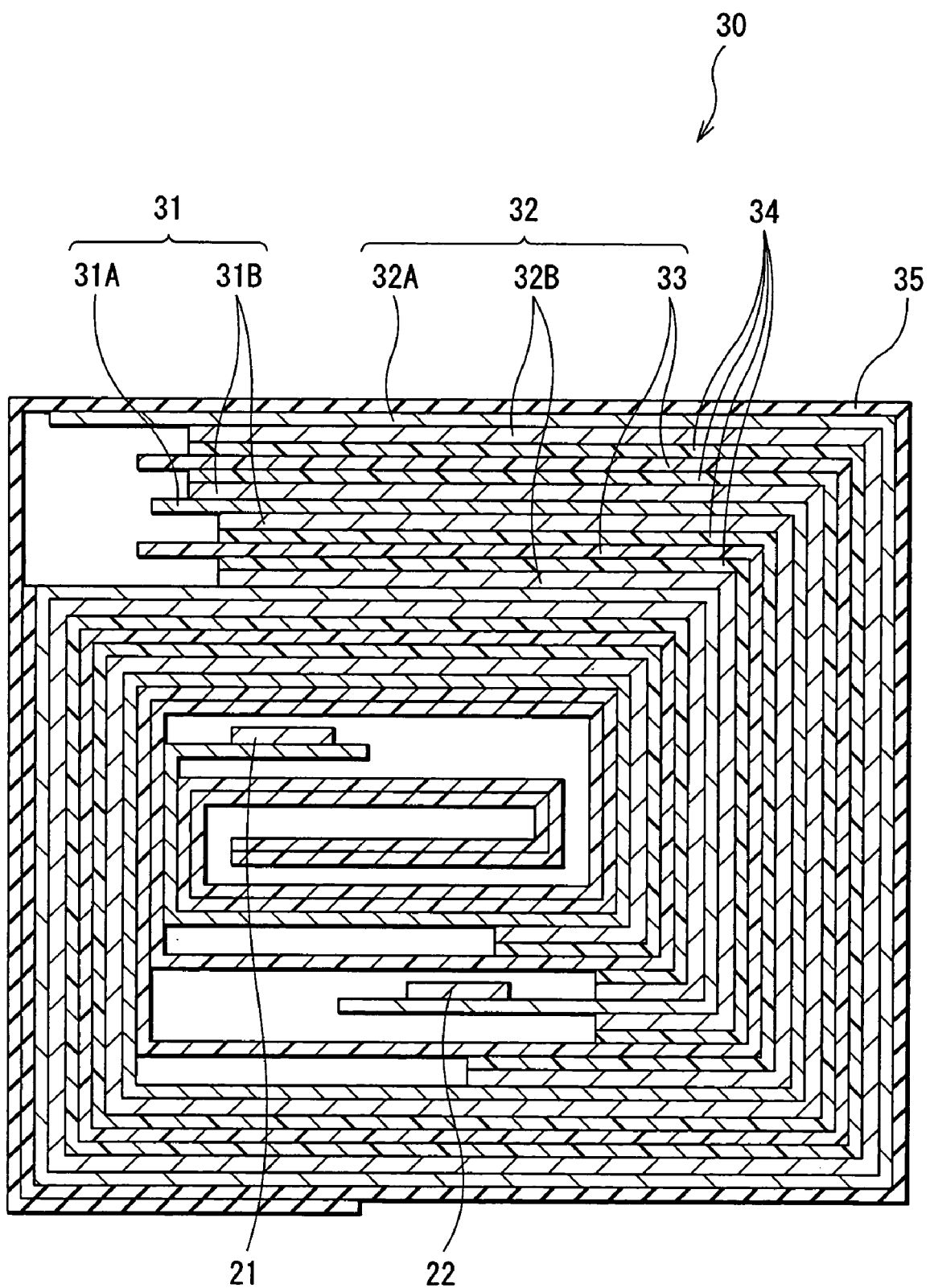
FIG. 3 is a cross sectional view showing a construction taken along line III-III of an electrode winding body illustrated in FIG. 2.

FIG. 3 is a view showing a cross sectional structure taken along line III-III of the electrode winding body 30 illustrated in FIG. 2. In the electrode winding body 30, a strip-shaped cathode 31 and an anode 32 are layered and wound with a separator 33 and an electrolyte layer 34 in between, and an outermost part is protected by a protective tape 35.

The cathode 31 has a structure wherein a cathode active material layer 31B is provided on one side or both sides of a cathode collector 31A. The anode 32 has a structure wherein an anode active material layer 32B is provided on one side or both sides of an anode collector 32A. Constructions of the cathode collector 31A, the cathode active material layer 31B, the anode collector 32A, the anode active material layer 32B, and the separator 33 are similar to those in the first embodiment.

The electrolyte layer 34 is made of so-called gel electrolyte, wherein an electrolyte solution is held in a holding body. The gel electrolyte is preferable since the gel electrolyte can prevent liquid leakage of the battery or expansion at high temperatures. A construction of the electrolyte solution (that is, the solvent and the electrolytic salt) is similar to that in the first embodiment.

The holding body is made of, for example, a polymeric material. Such a polymeric material includes, for example, polyvinylidene fluoride, the block copolymer.

The secondary battery can be, for example, manufactured as follows.

First, as in the first embodiment, after fabricating the cathode 31 and the anode 32, the electrolyte layer 34 wherein an electrolyte solution is held in a holding body is formed on the cathode 31 and the anode 32 respectively. After that, the cathode lead 21 is attached to an end of the cathode collector 31A by welding, and the anode lead 22 is attached to an end of the anode collector 32A by welding.

Subsequently, after making a lamination by layering the cathode 31 and the anode 32 to which the electrolyte layer 34 are formed, with the separator 33 in between, this lamination is wound in its longitudinal direction, the protective tape 35 is bonded to the outermost circumferential part to form the electrode winding body 30.

Finally, for example, the electrode winding body 30 is sandwiched between the exterior members 40A and 40B, and the electrode winding body 30 is enclosed by contacting outer edges of the exterior members 40A and 40B by heat anastomoses or the like. Then, the adhesive film 41 is inserted between the cathode lead 21, the anode lead 22 and the exterior members 40A, 40B. Consequently, the secondary battery shown in FIGS. 2 and 3 is completed.

This secondary battery acts as in the first embodiment, and similar effects can be obtained.

EXAMPLES

Further, descriptions about concrete examples of the invention will be made in detail.

Examples 1-1 to 1-15

Coin type secondary batteries having the shape in the FIG. 1 were fabricated. Therefore, descriptions herein will be made with reference to FIG. 1 by using its symbols.

First, powders of cobalt acid lithium ($LiCoO_2$) which was a cathode active material having an average particle diameter of 5 μm; carbon black which was a conductive material; and polyvinylidene fluoride which was a binder were mixed by a mass ratio of cobalt acid lithium:carbon black: polyvinylidene fluoride=92:3:5, which was put into N-methylpyrrolidone which was a dispersion medium to thereby obtain a cathode mixture slurry. This cathode mixture slurry was applied to the cathode collector 12A made of aluminum having a thickness of 30 μm, dried, and pressurized. Consequently, the cathode active material layer 12B was formed, and the cathode 12 was fabricated.

The anode active material layer 14B having a thickness of 2.2 μm made of amorphous silicon was formed on the anode collector 14A having a thickness of 25 μm made of an electrolytic copper foil by electron beam deposition method, and the anode 14 was fabricated. When the obtained anode 14 was analyzed by XPS (X-ray photoelectron spectroscopy) and AES (auger electron spectroscopy), it was confirmed that the anode active material layer 14B was alloyed with the anode collector 14A on at least a part of interface between the anode active material layer 14B and the anode collector 14A.

Subsequently, the anode 14 and the separator 15 having a thickness of 25 μm made of polypropylene were sequentially layered in the central part of the exterior cup 13, an electrolyte solution was injected, the exterior can 11 wherein the cathode 12 was put in was overlaid and caulked. Consequently, a secondary battery having a diameter of 20 mm and a height of 1.6 mm was fabricated. A solvent was formed by adding at least one of vinylene carbonate and vinylethylene carbonate as cyclic carbonic acid ester having unsaturated bonds to a mixture of ethylene carbonate and dimethyl carbonate having a mass ratio of ethylene carbonate:dimethyl carbonate=3:7. In the obtained solvent, $LiPF_6$ having a concentration of 1 mol/dm$^3$ was dissolved as an electrolytic salt, and the resultant was used as an electrolyte solution. Contents of vinylene carbonate and vinylethylene carbonate in the electrolyte solution were varied in Examples 1-1 to 1-15 as shown in Table 1.

TABLE 1

| | Anode active material layer | Cyclic carbonic acid ester having unsaturated bonds | | Capacity maintenance ratio of 30th cycle (%) |
| --- | --- | --- | --- | --- |
| | | Vinylene carbonate (wt %) | Vinylethylene carbonate (wt %) | |
| Example 1-1 | Si deposition type | 0.05 | 0 | 81 |
| Example 1-2 | Si deposition type | 0.1 | 0 | 85 |
| Example 1-3 | Si deposition type | 1 | 0 | 86 |
| Example 1-4 | Si deposition type | 5 | 0 | 91 |
| Example 1-5 | Si deposition type | 15 | 0 | 89 |
| Example 1-6 | Si deposition type | 30 | 0 | 83 |
| Example 1-7 | Si deposition type | 40 | 0 | 81 |
| Example 1-8 | Si deposition type | 0 | 0.05 | 82 |
| Example 1-9 | Si deposition type | 0 | 0.1 | 85 |
| Example 1-10 | Si deposition type | 0 | 1 | 87 |
| Example 1-11 | Si deposition type | 0 | 5 | 93 |
| Example 1-12 | Si deposition type | 0 | 15 | 92 |
| Example 1-13 | Si deposition type | 0 | 30 | 85 |
| Example 1-14 | Si deposition type | 0 | 40 | 82 |
| Example 1-15 | Si deposition type | 3 | 2 | 93 |
| Comparative example 1-1 | Si deposition type | 0 | 0 | 80 |
| Comparative example 1-2 | Si application type | 0 | 0 | 54 |
| Comparative example 1-3 | Si application type | 5 | 0 | 52 |
| Comparative example 1-4 | Si application type | 0 | 5 | 54 |
| Comparative example 1-5 | Si application type | 3 | 2 | 51 |

Regarding the obtained secondary batteries of Examples 1-1 to 1-15, a charge and discharge test was conducted at 25° C. and their capacity maintenance ratios of 30th cycle were obtained. Charging was made with a constant current density of 1 mA/cm$^2$ until battery voltage reached 4.2 V, and then with a content voltage of 4.2 V until current density reached 0.02 mA/cm$^2$. Discharging was made with a constant current density of 1 mA/cm$^2$ until battery voltage reached 2.5 V. In charging and discharging, based on a charge and discharge capacity of the cathode 12 and the anode 14 previously obtained by calculation, anode utilization ratio in an initial charging was set to 90% not to precipitate metal lithium. A capacity maintenance ratio of 30th cycle was calculated as a ratio of discharge capacity of 30th cycle in relation to an initial discharge capacity, i.e. as (discharge capacity of 30th cycle)/(initial discharge capacity)×100.

Obtained results are shown in Table 1.

As Comparative example 1-1 in relation to Examples 1-1 to 1-15, a coin type secondary battery was fabricated in a manner similar to in Examples 1-1 to 1-15, except that vinylene carbonate and vinylethylene carbonate were not added to the electrolyte solution. In addition, as Comparative examples 1-2 to 1-5 in relation to Examples 1-1 to 1-15, coin type secondary batteries were fabricated in a manner similar to in Examples 1-1 to 1-15, except that the anode active material layer was formed by application and contents of vinylene carbonate and vinylethylene carbonate in the electrolyte solution were varied as shown in Table 1. Then, silicon powders, the anode active material having an average particle diameter of 1 μm of 70 wt %; squamation artificial graphite of 20 wt % which was an anode active material and a conductive material; and polyvinylidene fluoride, the binder of 10 wt % were mixed, the resultant was put into N-methyl pyrrolidone, the dispersion medium to obtain an anode mixture slurry. This slurry was applied to the anode collector, dried, and pressurized. Consequently, the anode active material layer was formed. Regarding secondary batteries in Comparative examples 1-1 to 1-5, a charge and discharge test was conducted in a manner similar to in Examples 1-1 to 1-15, and capacity maintenance ratios of 30th cycle were obtained. These results are also shown in Table 1.

As evidenced by Table 1, according to Examples 1-1 to 1-15 wherein at least one of vinylene carbonate and vinylethylene carbonate was contained in the electrolyte solution, high capacity maintenance ratios were obtained, compared to in Comparative example 1-1 wherein vinylene carbonate and vinylethylene carbonate were not contained. On the contrary, in Comparative examples 1-2 to 1-5 wherein the anode active material layer was formed by application, capacity maintenance ratios of Comparative examples 1-3 to 1-5 containing at least one of vinylene carbonate and vinylethylene carbonate were equal to or less than that of Comparative example 1-2 containing no vinylene carbonate and vinylethylene carbonate. That is, it was found that in the secondary battery wherein the anode active material layer 14B is formed by vapor-phase method, and alloyed with the anode collector 14A on at least a part of interface between the anode active material layer 14B and the anode collector 14A, when at least one of vinylene carbonate and vinylethylene carbonate is contained in the electrolyte solution, its cycle characteristics can be improved.

Further, from the results of Examples 1-1 to 1-15, a trend was shown that capacity maintenance ratios became high when raising total contents of vinylene carbonate and vinylethylene carbonate, and became low after showing the maximum value. That is, it was found that when a total content of vinylene carbonate and vinylethylene carbonate in the electrolyte solution was set to 0.1 wt % to 30 wt %, higher effects could be obtained.

Example 2

A coin type secondary battery was fabricated in a manner similar to in Example 1-4, except that the anode active material layer 14B was formed by sinter method. That is, vinylene carbonate at a rate of 5 wt % was added to an electrolyte solution. Silicon powders, the anode active material having an average particle diameter of 1 μm of 90 wt % and polyvinylidene fluoride, the binder of 10 wt % were mixed, the resultant was put into N-methylpyrrolidone, the dispersion medium to obtain an anode mixture slurry. This slurry was applied to the anode collector 14A, dried, pressurized, and then provided with heat treatment at 400° C. under vacuum atmosphere for 12 hours. Consequently, the anode active material layer 14B was formed. Further, as Comparative example 2 in relation to Example 2, a coin type secondary battery was fabricated in a manner similar to in Example 2 except that vinylene carbonate was not added to the electrolyte solution. In the secondary batteries in Example 2 and Comparative example 2, a charge and discharge test was conducted and their capacity maintenance ratios of 30th cycle were obtained as in Examples 1-1 to 1-15. The results are shown in Table 2. When the anode 14 of Example 2 was analyzed by XPS and AES as in Examples 1-1 to 1-15, it was verified that the anode active material layer 14B was alloyed with the anode collector 14A on at least a part of interface between the anode active material layer 14B and the anode collector 14A.

TABLE 2

|  | Anode active material layer | Vinylene carbonate (wt %) | Capacity maintenance ratio of 30th cycle (%) |
| --- | --- | --- | --- |
| Example 2 | Si sinter type | 5 | 86 |
| Comparative example 2 | Si sinter type | 0 | 75 |

As shown in Table 2, according to Example 2 wherein vinylene carbonate was contained in the electrolyte solution, higher capacity maintenance ratio was obtained than that of Comparative example 2 containing no vinylene carbonate, as in Example 1-4. That is, it was found that in the secondary battery wherein the anode active material layer 14B was formed by sinter method, and the anode active material layer 14B was alloyed with the anode collector 14A on at least a part of interface between the anode active material layer 14B and the anode collector 14A, when vinylene carbonate was contained in the electrolyte solution, cycle characteristics could be improved as well.

Example 3

A secondary battery having a shape shown in FIGS. 2 and 3 was fabricated by using a gel electrolyte. Here, descriptions will be made with reference to FIGS. 2 and 3 by using the symbols thereof.

First, the cathode 31 was fabricated as in Examples 1-1 to 1-15. In addition, the anode 32 was fabricated by depositing with electrolytic plating a tin layer having a thickness of 2.2 μm on the same anode collector 32A as in the Examples 1-1 to 1-15, and then forming the anode active material layer 32B by heat treatment in vacuum. When the anode 32 in Example 3 was analyzed by XPS and AES as in Examples 1-1 to 1-15, it was verified that the anode active material layer 32B was alloyed with the anode collector 32A on at least a part of interface between the active material layer 32B and the anode collector 32A. Then, vinylethylene carbonate was added to a mixture of ethylene carbonate, propylene carbonate, and LiPF$_6$, the electrolytic salt, having a mass ratio of ethylene carbonate:propylene carbonate: LiPF$_6$=42:42:16. Consequently, an electrolyte solution was prepared. A content of the vinylethylene carbonate in the electrolyte solution was set to 5 wt % as shown in Table 3. After that, a precursor solution wherein polyvinylidene fluoride of 10 wt %, the block copolymer having its weight average molecular mass of 0.6 million, and dimethyl carbonate of 60 wt %, the solvent for polymeric materials are mixed and dissolved into an electrolyte solution of 30 wt % was applied to the cathode 31 and the anode 32, respectively. The resultants were left for 8 hours at normal temperatures, and dimethyl carbonate was volatilized. The electrolyte layer 34 was therefrom formed on the cathode 31 and the anode 32, respectively.

TABLE 3

| | Anode active material layer | Vinylethylene carbonate (wt %) | Capacity maintenance ratio of 30th cycle (%) |
|---|---|---|---|
| Example 3 | Sn plating type | 5 | 92 |
| Comparative example 3-1 | Sn plating type | 0 | 76 |
| Comparative example 3-2 | Sn application type | 0 | 48 |
| Comparative example 3-3 | Sn application type | 5 | 41 |

Subsequently, the cathode 31 and the anode 32 were cut in the strip shape, the cathode lead 21 was attached to the cathode 31, and the anode lead 22 was attached to the cathode 32. After that, the cathode 31 and the anode 32 wherein the electrolyte layer 34 was formed were layered to obtain a lamination, which was wound to form the electrode winding body 30.

Lastly, this electrode winding body 30 was sandwiched between the exterior members 40A and 40B made of aluminum laminated films, and the electrode winding body 30 was enclosed by heat anaastomoses under reduced pressure. Then, the adhesive films 41 made of a resin were inserted between the cathode lead 21, the anode lead 22, and the exterior members 40A, 40B. Consequently, the secondary battery shown in FIGS. 2 and 3 was obtained.

Regarding the obtained secondary battery in Example 3, a charge and discharge test was conducted as in Examples 1-1 to 1-15, and a capacity maintenance ratio of 30th cycle was obtained. Obtained result is shown in Table 3.

As Comparative example 3-1 in relation to Example 3, a secondary battery was fabricated in a manner similar to in Example 3 except that vinylethylene carbonate was not added to the electrolyte solution. As Comparative examples 3-2 and 3-3 in relation to Example 3, secondary batteries were fabricated in a manner similar to in Example 3 except that powders of tin having an average particle diameter of 1 μm instead of silicon powders having an average particle diameter of 1 μm were used, the anode active material layer was fabricated in a manner similar to Comparative examples 1-2 to 1-5, and a content of vinylethylene carbonate in the electrolyte solution was varied as shown in Table 3. That is, vinylethylene carbonate was not added in Comparative example 3-2, and vinylethylene carbonate was added so that a content of vinylethylene carbonate in the electrolyte solution became 5 wt % in Comparative example 3-3. Regarding the secondary batteries in Comparative examples 3-1 to 3-3, charge and discharge tests were conducted and their capacity maintenance ratios of 30th cycle were obtained in a manner similar to Examples 1-1 to 1-15. These results are also shown in Table 3.

As evidenced by Table 3, according to Example 3 containing vinylethylene carbonate, higher capacity maintenance ratio was obtained compared to in Example 3-1 not containing vinylethylene carbonate. On the contrary, regarding Comparative examples 3-2 and 3-3 wherein the anode active material layer was formed by application, higher capacity maintenance ratio was obtained in Comparative example 3-2 containing no vinylethylene carbonate compared to Comparative example 3-3 containing vinylethylene carbonate. That is, it was found that, even in the secondary battery wherein the anode active material layer 32B was formed by liquid phase method, and the anode active material layer 32B was alloyed with the anode collector 32A on at least a part of interface between the anode active material layer 32B and the anode collector 32A, when the electrolyte solution contains vinylethylene carbonate, its cycle characteristics could be improved. In addition, it was found that when a gel electrolyte was used, cycle characteristics could be improved as well.

In the foregoing Examples, descriptions have been made regarding cyclic carbonic acid ester having unsaturated bonds with reference to vinylene carbonate and vinylethylene carbonate specifically. However, similar results can be obtained when using other cyclic carbonic acid esters having unsaturated bonds. Further, similar results can be obtained when the anode active material layer 14B, and the anode active material layer 32B are formed by vapor-phase method other than electron beam deposition method, liquid phase method other than electrolytic plating, or other sinter method.

While the invention has been described with reference to the embodiments and Examples, the invention is not limited to the foregoing embodiments and Examples, and various modifications may be made. For example, though in the foregoing embodiments and Examples, the case using the polymeric material as a holding body has been described, an inorganic conductor such as lithium nitride and lithium phosphate can be used as a holding body, and mixture of a polymeric material and an inorganic conductor can be used.

Further, in the foregoing embodiments and Examples, the anode active material layer 14B and the anode active material layer 32B are formed on the anode collector 14A and the anode collector 32A. However, other layer can be formed between the anode collector and the anode active material layer.

In addition, in the foregoing embodiments and Examples, the coin type and the winding laminated type secondary batteries have been described. However, the invention can be applied similarly to secondary batteries of cylinder type, square type, button type, thin type, large type, and multilayer laminated type. Further, the invention can be applied not only to the secondary batteries, but also to primary batteries.

As described above, according to the battery of the invention, the electrolyte contains cyclic carbonic acid ester having unsaturated bonds. Therefore, a strong and stable film can be formed on the anode active material layer, and decomposition of the electrolyte solution in the anode can be inhibited by the film. Consequently, cycle characteristics can be improved.

According to the battery of one aspect of the invention, a content of cyclic carbonic ester in the electrolyte solution is set to 0.1 wt % to 30 wt %. Therefore, lowering of load characteristics is inhibited, and charge and discharge cycle characteristics can be improved.

Obviously many modifications and variations of the present invention are possible in the light of the above teachings. It is therefore to be understood that within the scope of the appended claims the invention may be practiced otherwise than as specifically described.

What is claimed is:

1. A battery, comprising:
   a cathode;
   an anode; and
   an electrolyte,
   wherein,
   the anode has an anode collector made of an electric copper foil and an anode active material layer which is formed on the anode collector by vapor-phase method, and
   the electrolyte contains an electrolyte solution containing vinylethylene carbonates, an electrolytic salt, and a polymeric material.

2. A battery according to claim 1, wherein the anode active material layer is alloyed with the anode collector on at least a part of interface between the anode active material layer and the anode collector.

3. A battery according to claim 1, wherein the anode active material layer includes at least one kind from the group consisting of (Si) and compounds of silicon.

4. A battery according to claim 1, wherein the electrolyte solution further contains vinylene carbonate.

5. A battery according to claim 4, wherein a content of the vinylene carbonate in the electrolyte solution is from 0.1 wt % to 30 wt %.

6. A battery according to claim 1, wherein film exterior members which house the cathode, the anode, and the electrolyte are further provided.

7. A battery according to claim 1, wherein the cathode contains a metal complex oxide including lithium.

* * * * *